United States Patent Office 3,786,026
Patented Jan. 15, 1974

3,786,026
METHOD OF PREPARING HIGH MOLECULAR WEIGHT POLYOXYMETHYLENES
Jacob Ackermann, Gorla Minore, Varese, and Pierino Radici, Turate, Como, Italy, assignors to Societá Italiana Resine S.p.A., Milan, Italy
No Drawing. Filed Nov. 4, 1971, Ser. No. 195,842
Claims priority, application Italy, Nov. 12, 1970, 31,631/70
Int. Cl. C08g 1/02
U.S. Cl. 260—67 FP    8 Claims

ABSTRACT OF THE DISCLOSURE

Polyoxymethylenes are produced by polymerizing cyclic monomers in the presence of up to 10 mole percent of short chain polyoxymethylene ethers, the monomers used being highly purified and the ratio of polymerization to induction time being between 2 and 10 to 1.

---

The present invention relates to a process for the production of polyoxymethylenes of high molecular weight which are thermally stable, resistant to alkaline attack and which have high mechanical properties.

It is already known that, in the polymerization of formaldehyde and of its cyclic oligomers, polyoxymethylenes are obtained which have as terminal groups hydroxyl groups which are thermally unstable.

It has been found that esterified or esterified hydroxyl terminal groups or urethane terminal groups impart thermal stability to polyoxymethylenes.

For this purpose, the industry subjects the products of polymerization of formaldehyde and its cyclic oligomers to reaction, for example with acetic anhydride, trimethyl orthoformate or isocyanates.

Such processes do however have the disadvantage of having to be performed in two quite distinct stages: a stage to polymerize the formaldehyde or its cyclic oligomers and then a subsequent stage in which the polymers obtained in the first stage are further caused to react so as to modify their terminal hydroxyl groups.

In addition, such processes are rather involved, because the reactions following polymerization are accompanied by losses of useful products and are economically disadvantageous. In another system, during polymerization of the formaldehyde or its cyclic oligomers, comonomers are introduced so that, in the macromolecular chain, these groups are present:

$$\begin{array}{c} R_1 \\ | \\ C \\ | \\ R_{2n} \end{array}$$

in which $R_1$ and $R_2$ are radicals of various kinds and $n$ is equal to or greater than 2.

The crude products of polymerization are subsequently depolymerized, so as to provide products which have terminal groups formed by the comonomers, characterized in that they are thermally stable and alkaline inactive.

In such a case, however, by virtue of the presence in the chains of the aforesaid extraneous groups, a product of a different structure is obtained, in other words a copolymer instead of a homopolymer, and its overall mechanical properties are inferior to those of the homopolymer. Therefore, it is particularly interesting to obtain polyoxymethylenes which combine the mechanical properties of the homopolymers with those of thermal stability and resistance to alkaline action of the copolymers, working in the single stage of polymerization.

The literature describes polymers of formaldehyde which are stable to heat and the action of alkali obtained by polymerization of the trioxane in the presence of methylal (H. D. Hermann—Die Makromoleculare Chemie 90 (1966) 1). Such polymers are homopolymers with a high percentage of methoxyl terminal groups instead of hydroxyl groups which would be obtained as terminal groups if polymerization were performed in the absence of methylal.

However, the polymerization of trioxane, purified by known systems (for example crystallization, distillation, sublimation carried out in this way, does not make it possible to obtain polymers of very high molecular weight. It seems that this is due to the presence in the trioxane of traces of impurities which, under the conditions of reaction, act as "chain-transfer" agents (V. Jaacks—Die Makromoleculare Chemie 115 (1968), 290).

More precisely, by regulating the quantity of methylal added to the purified trioxane, it is possible to obtain polymers of high thermal stability and stability to alkaline action, but not of very high molecular weight, and vice versa. In the past it has not been possible in practice to obtain polymers which have at one and the same time high thermal stability and alkaline action and stability to a high molecular weight.

In practice, by polyoxymethylenes having inherent viscosity (measured in p-chlorophenol with 2% alpha-pinene at 60° C., with a concentration of 0.5 g./100 cc.) comprised in the range from 1.0 to 2.0, it is not possible to obtain stable fractions, in other words fractions with methoxyl terminal groups, in excess of approx. 60%.

The object of the present invention is a process by which it is possible directly to produce polyoxymethylenes of high molecular weight which combine the high mechanical properties of the homopolymers with those of the stability of copolymers, in a single phase of polymerization. More particularly, the object of the present invention is a process by which it is possible directly to produce polyoxymethylenes having inherent viscosity (measured under the above-mentioned conditions) comprised in the range from 1.0 to 2.0 with a percentage of alkoxy or cyclic alkoxy terminal groups in excess of 60% and normally comprised between 70 and 90%.

This process provides for polyoxymethylenes to be formed by polymerization of cyclic monomers of formaldehyde of high purity of the type $(CH_2O)_n$, in which $n$ is at least 3, in the presence of compounds, which can be referred to as short chain polyoxymethylene ethers, of the type $R_1$—O—$(CH_2O)_m$—$R_2$, in which $m$ is a number preferably between 1 and 5 and $R_1$ and $R_2$ consist of alkyl, cyclo-alkyl, radicals, substituted and otherwise, said polymerization being carried out by regulating the total duration so that the proportion of total duration of polymerization to induction time is in the range from 2 to 10 and preferably from 3 to 5.

For convenience, this proportion will be referred to hereinafter as R. An essential aspect of the present invention is the use of cyclic monomers of formaldehyde of particular purity, which may be obtained by a process of purification. According to such a purification process, the monomer is percolated at a temperature just above its melting point through a resin exchange column, preferably macroreticular, of the cationic type salified, with alkali metals or alkaline earth metals.

Another essential aspect of the process of the present invention is regulation of the total duration of polymerization so that its proportion to the induction time is beween 2 and 10, preferably between 3 and 5.

It is already known that the cationic polymerization of the cyclic oligomers of formaldehyde is characterized by an initial period of induction during which no macromolecular products but only formaldehyde form. In this period, the formaldehyde is liberated by the "carbon" ion which forms in the primary stage of polymerization, and an equilibrium concentration dependent upon the temperature is attained (J. Polymer Sci. 48 (1960) 399).

The following examples and description, the term induction time relates to the period of time which elapses between introduction of the catalyst and appearance of the first opalescence in the reaction mass, which denotes the commencement of the formation of macromolecular chains According to this process, the quantity of compounds containing R—O— groups fed to the reactor may vary from 0.001 to 10 mole percent in respect of the monomer, but in the preferred embodiments it is comprised between 0.8 and 2.5 mole percent.

In polymerization, the cyclic monomers of formaldehyde may be in the vapor phase, liquid phase or even in the solid phase.

In the liquid phase, the monomers are dissolved or dispersed in an inert solvent such as for example cyclohexane, heptane and methylene chloride.

The temperature in the polymerization ambient is preferably between 20 and 80° C.

In polymerization en masse in the molten state, on the other hand, the temperature used is between 60 and 120° C. which, in the event of the monomer being trioxane, is preferably comprised between 60 and 90° C. As catalysts for polymerization, those catalysts are used which are normally employed in cationic type polymerizations.

In particular, those compounds may be used which are known as electron acceptors, such as for example boron trifluoride, boron trichloride, zinc chloride, stannic chloride, titanium chloride, alone or in the form of molecular complexes, for example diethyl-etherate, sodium p-nitro-benzene fluoroborate, or mineral acids such as perchloric acid, sulphuric acid, or organometallic complexes of molybdenum such as for example molybdenum dioxy-acetyl-acetonate.

The concentrations of catalysts may be comprised between 0.0001 and 1% in respect of the monomer, with a preferred range of 0.001 to 0.01%.

In polymerization en masse, the reaction is normally very rapid and is completed within a few minutes. In this case, traces of the above specified catalysts are sufficient. According to the working conditions, it is possible in this way to obtain polymers in the form of fine powders or solid blocks, the conversion rate being from 60 to 90% in respect of the monomer.

The polyoxymethylenes which are thus produced have inherent viscosities (measured in p-chlorophenol with 2% alpha-pinene at 60° C., with a concentration of 0.5 g./100 cc.) of between 1.0 and 2.0 and a percentage of terminal alkoxyl groups or cycloalkoxyl groups comprised between 70 and 90%. Polymerization may be carried out discontinuously or continuously.

For a continuous process, a reactor consisting of a common single screw or self-cleaning multi-stage twin-screw extruder may be satisfactory. With such machines, it is very simple to control the temperature, time or dwell spectrum. After the crude polymer has been processed to eliminate the residues of catalyst and the part of the polymer the chains of which have unstable terminal groups, for example by heat treatment with an alkaline (methanol or ethanol) solution containing a high basicity amine such as triethyl-amine, polyoxymethylene polymers are obtained which are interesting by virtue of their technological properties and by the ease with which they can be worked.

EXAMPLE 1

A sample of commercial trioxane was purified by percolation in the molten state through a macroreticular cationic resin exchanger column with —SO₃H groups salified with potassium.

The operation was performed in a nitrogen atmosphere with the temperature of the column maintained at 65° C. by the circulation of oil in the outer shell.

With a bed of resin in the column 80 cm. high and 2.5 cm. in diameter, the rate of percolation was 450 to 500 cc./hr. 100 g. of trioxane purified in this way were introduced directly into a steel reactor in such a way that the final solid polymer took on an easily extractable strip form.

The reactor was fitted with an agitator and with a sleeve for measurement of the temperature by means of a thermocouple. The reactor also had two apertures in its upper part: one for introduction of the catalyst and other substances and another for maintaining an inert atmosphere by means of a stream of nitrogen.

The reactor was immersed in a hot oil bath so that the internal temperature was 65° C. By means of microsyringes, 0.0035 g. BF$_3$ was introduced into the reactor in the form of BF$_3$ diethyl-etherate in solution at the rate of 1% by weight in pure nitro-benzene. The agitator was run for 10 seconds and then stopped.

After one minute, the reaction started with the formation of polymeric chains insoluble in trioxane and, after a few seconds a block of polymer appeared. After 4 minutes, the reaction was stopped, and the system was cooled to the temperature of 0° C.

The polymer, converted to powder, was treated twice with a methanol solution containing 1% triethanol amine at boiling point for 30 minutes to eliminate the residue of catalyst and monomer. The filtered polymer was washed thoroughly with methanol and dried in a vacuum oven at 70° C. The yield and inherent viscosity ($\eta_{in.}$) of the polymer obtained were determined.

The inherent viscosity of the polymer was determined at 60° C. in a solution of parachlorophenol containing 2% by weight alpha-pinene with a concentration of the polymer equal to 0.5 g. per 100 cc. A sample of the polymer was subjected to heat degradation in a nitrogen atmosphere at 220° C. to determine the fraction of polymer with the chains blocked with groups —O—CH$_3$. The percentage of polymer left after 60 minutes of such treatment will be shown to represent the thermally stable part ($K_s$). The alkali-stable fraction was determined on another sample of polymer. The polymer was brought into solution in benzyl alcohol containing 1% by weight of triethanol amine at a temperature between 150 and 155° C. for a period of 30 minutes. The ratio of polymer:benzyl alcohol was 1:10. The solution of polymer was poured hot into methanol. After cooling, the suspension obtained was filtered and the polymer was washed thoroughly with methanol on a filter. The polymer was then kept in suspension with methanol at boiling for approx. 1 hour. After cooling, the suspension was filtered and the polymer was washed with methanol and then dried in a vacuum oven at 70° C.

The percentage of polymer left after such treatment was indicated as the alkali stable fraction of the polymer ($K_{s'}$). On the thermally stable and alkali stable fractions ($K_{a'}$), the inherent viscosity was determined $\eta_{in.}(K_s)$ and $\eta_{in.}(K_{s'})$. The results of all tests are shown in Table 1.

EXAMPLE 2

100 g. of trioxane purified as in Example 1 were introduced into a reactor identical to that used in Example 1, maintained in a nitrogen atmosphere at a temperature of 65° C. Again, the procedure followed was as in Example 1, but the polymerization reactor was stopped during cooling of the system to 0° C. after 10 minutes. The results obtained are set out in Table 1.

EXAMPLE 3

100 g. of trioxane purified as in Example 1 were introduced into a reactor identical to that used in Example 1, maintained in an atmosphere of nitrogen at a temperature of 65° C. 1.5 g. CH$_3$—O(CH$_2$O)$_2$—CH$_3$ and subsequently 0.0035 g. BF$_3$ in the form of BF$_3$ diethyl etherate in a solution of 1% by weight in pure nitro-benzene were then introduced by means of micro-syringes. The agitator of the reactor was operated for 10 seconds and then stopped.

After 30 seconds, polymerization commenced with separation of insoluble polymer from the trioxane. After 2 minutes, the reaction was stopped, with instant cooling to 0° C.

The block of polymer obtained was subjected to the same treatments and analyses as in Example 1. The results are set out in Table 1.

EXAMPLE 4

The procedure adopted was as in Example 3. After 30 seconds, the formation of polymer commenced. After 5 minutes, the reaction was stopped, the system cooling to 0° C. The polymer was subjected to the same treatment and analyses as in Example 1. The results obtained are set out in Table 1:

TABLE 1

| Example | R | Yield (gr.) | $\eta_{in.}$ | $K_s$ | $\frac{\eta_{in.}}{(K_s)}$ | $K_s'$ | $\frac{\eta_{in.}}{(K_s')}$ |
|---|---|---|---|---|---|---|---|
| 1 | 4 | 55 | 2.90 | 30.2 | 2.78 | 29.8 | 2.70 |
| 2 | 10 | 60 | 2.45 | 33.7 | | | |
| 3 | 4 | 80 | 1.84 | 78.3 | 1.88 | 79.0 | 1.82 |
| 4 | 10 | 90 | 0.95 | 88.3 | | | |

EXAMPLE 5

A sample of 500 g. pure commercial trioxane was subjected to treatment with 15 g. sodium-potassium alloy (1:1) and left to settle for 6 hours in a 1-litre vessel provided with a rotary evaporator.

In the gravity condenser, it was made to circulate by means of a water pump thermostatically controlled to the temperature fo 65° C. to prevent the trioxane from crystallizing.

A stream of nitrogen washing over the top of the condenser ensured perfectly anhydrous conditions in the system. Subsequenlty, the trioxane was distilled at slightly reduced pressure. 100 g. of trioxane purified in this way were introduced into a reactor having the same specifications as that used in Example 1 maintained in a nitrogen atmosphere at a temperature of 70° C.

Then, 1.5 g. $CH_3$—O—$CH_2O$—$CH_3$ and then 0.0035 g. $BF_3$ in the form of $BF_3$ diethyl-etherate in solution of 1% by weight in nitrobenzene were introduced into the reactor. The agitator of the reactor was set in motion and run for 10 seconds and then stopped. Formation of polymer commenced after 2 minutes. After 8 minutes, the polymerization reaction was stopped, the system cooling to 0° C.

The block polymer obtained was extracted from the reactor and subjected to the treatments and analyses described in Example 1. The results are set out in Table 2.

EXAMPLE 6

100 g. of trioxane purified as described in Example 1 were introduced into a reactor identical to that used in Example 1, maintained in a nitrogen atmosphere and at a temperature of 70° C.

1.5 g. $CH_3$—O—$(CH_2O)$—$CH_3$ and then 0.0035 g. of $BF_3$, as $BF_3$ diethyl-etherate in a solution of 1% by weight in nitrobenzene, were introduced into the reactor. The agitator of the reactor was run for 10 seconds and then stopped. After 30 seconds, the reaction started with the formation of polymer which was insoluble in trioxane. After 2 minutes, the reaction was stopped by cooling to 0° C.

The block polymer obtained was extracted from the reactor and subjected to the treatments and analyses in Example 1. The results are set out in Table 2.

TABLE 2

| Example | R | Yield (gr.) | $\eta_{in.}$ | $K_s$ | $\eta_{in.}\,(K_s)$ |
|---|---|---|---|---|---|
| 5 | 4 | 55 | 0.50 | 83 | 0.48 |
| 6 | 4 | 78 | 1.40 | 80.5 | 1.41 |

EXAMPLE 7

100 g. pure commercial trioxane, purified as described in Example 5, were introduced into a reactor identical to that used in Example 1, maintained in an atmosphere of nitrogen and at a temperature of 90° C.

By using a syringe, 0.050 g. $CH_3$—O—$(CH_2O)_4$—$CH_3$ and 0.0030 g. $BF_3$ in the form of $BF_3$ diethyl-etherate in solution of 1% in nitro-benzene were introduced into the reactor. The agitator was then run for 10 seconds and stopped.

After 10 seconds, the polymerization reaction had started with the final formation of a block of polymer. After 5 minutes, the reaction was stopped, the system suddenly being cooled to 0° C.

The crude polymer was extracted from the reactor, converted to powder and subjected to the treatment and analyses described in Example 1. The results obtained are set out in Table 3.

EXAMPLE 8

The procedure adopted was as in Example 7, but trioxane purified as described in Example 1 was used. After 15 seconds, the reaction started with the final formation of a block of polymer. After 2.5 minutes, polymerization was stopped by the system being cooled to 0° C. The results obtained, after having proceeded as in the previous example, are set out in Table 3.

EXAMPLE 9

100 g. of trioxane, purified as described in Example 1, were introduced into a reactor having the same specifications as that used in Example 1, maintained in inert atmosphere with a stream of nitrogen washing over it and at a temperature of 63° C.

Subsequently, 5 g. $CH_3$—O—$(CH_2O)$—$CH_3$ and 0.0020 g. of $BF_3$, in the form of $BF_3$ diethyl-etherate in solution of 1% in nitro-benzene were introduced. The agitator of the reactor was run for 10 seconds and then stopped. After 20 seconds, the reaction had started with the separation of polymer insoluble in trioxane. After 1.5 minutes, polymerization was stopped by cooling. The block of polymer obtained was first converted to powder and then subjected to the treatments and analyses described in Example 1. The results obtained are set out in Table 3.

TABLE 3

| Ex. | R | Yield | $\eta_{in.}$ | $K_s$ | $\eta_{in.}\,(K_s)$ | $K_s'$ | $\eta_{in.}\,(K_s')$ |
|---|---|---|---|---|---|---|---|
| 7 | 10 | 62 | 0.38 | 85 | 0.34 | 86 | 0.40 |
| 8 | 10 | 60 | 1.58 | 84.7 | 1.60 | 83 | 1.57 |
| 9 | 4.5 | 75 | 1.72 | 78.4 | 1.74 | | |

EXAMPLE 10

100 g. of tetroxane purified by the same system as described in Example 1, but with the temperature of the resin column maintained at 120° C., were introduced into a glass vessel of 2-litres capacity containing 1000 cc. anhydrous cyclohexane. The four-neck vessel was fitted with an agitator and also a reflux condenser and thermometer. A stream of nitrogen was passed over the top of the condenser so as to allow an inert atmosphere to be maintained in the system.

By heating with a thermostatically controlled oil bath, the temperature of the mixture was raised to 70° C. By means of a syringe, 2.5 g. $CH_3$—O—$(CH_2O)_4$—$CH_3$ and then 0.010 g. $BF_3$ in the form of $BF_3$ diethyl-etherate in solution at 1% in nitro-benzene were introduced.

The polymerization reaction started almost at once with the formation of polymer which was insoluble in the medium. The suspension of the polymer was gradually formed and was kept in agitation for 60 minutes.

The reaction was stopped at this point by cooling the mixture to 15° C. and adding 100 cc. of a 1% solution of triethyl-amine in methanol.

The suspension was filtered and the powdered polymer thus obtained was subjected to the treatments and the analyses described in Example 1.

In this way, 55 g. of polymer were obtained with an inherent viscosity of 1.64 and a $K_s$ value of 83.

We claim:

1. A process for the production of polyoxymethylenes by polymerization comprising polymerizing cyclic monomers of the type $(CH_3O)_n$ in which $n$ is 3 or 4, said monomers having been purified by percolation at a temperature just above their melting point through a resin exchange column of the cationic type salified with alkali or alkaline earth metals, said polymerization being carried out in the presence of short chain polyoxymethylene ethers of the type $R_1-O-(CH_2O)_m-R_2$ wherein $m$ is 1 to 5 and $R_1$ and $R_2$ are alkyl or cycloalkyl radicals, and said polymerization being so regulated that the ratio of the total duration of said polymerization to the induction time is between 2 and 10 to 1 the quantity of said polyoxymethylene is from 0.001 to 10 mole percent of the monomer.

2. The process according to claim 1, characterized in that said ratio is between 3 and 5 to 1.

3. The process according to claim 1, characterized in that the quantity of said ether is 0.8 to 2.5 mole percent.

4. The process according to claim 1, characterized in that a catalysts are used electron-acceptor compounds selected from the group consisting of boron trifluoride, boron trichloride, zinc chloride, stannic chloride and titanium chloride, molecular complexes, of electron acceptor compounds selected from the group consisting of diethyletherate and sodium p-nitro-benzenefluoroborate, mineral acids selected from the group consisting of perchloric acid, sulphuric acid or organo-metallic complexes of molybdenum, such as molybdenum dioxy-acetylacetone, in quantities comprised between 0.0001 and 1% in respect of the monomers.

5. The process according to claim 4 in which the quantities of catalyst are from 0.001 to 0.01%.

6. The process according to claim 1, characterized in that said polymerization is carried out in the liquid phase, the cyclic monomers of formaldehyde being dissolved or dispersed in an inert solvent selected from the group consisting of cyclohexane, hexane and methylene chloride, at a temperature comprised between 20 and 80° C.

7. The process according to claim 1, characterized in that the polymerization of the cyclic monomers of formaldehyde is carried out en masse in the molten state with the temperature between 60 and 120° C.

8. The process of claim 1 wherein said resin exchange column is of the macroreticular type.

References Cited

FOREIGN PATENTS

| | | | |
|---|---|---|---|
| 3,337,507 | 8/1967 | Gutweiler et al. | 260—67 FP |
| 3,346,663 | 10/1967 | Kern et al. | 260—67 FP X |

FOREIGN PATENTS

| | | | |
|---|---|---|---|
| 1,422,094 | 11/1965 | France | 260—340 |

WILLIAM H. SHORT, Primary Examiner

L. M. PHYNES, Assistant Examiner